Jan. 22, 1924.
W. G. KIRCHHOFF
DOUGH MIXER
Filed Feb. 21 1922
1,481,556
5 Sheets-Sheet 2
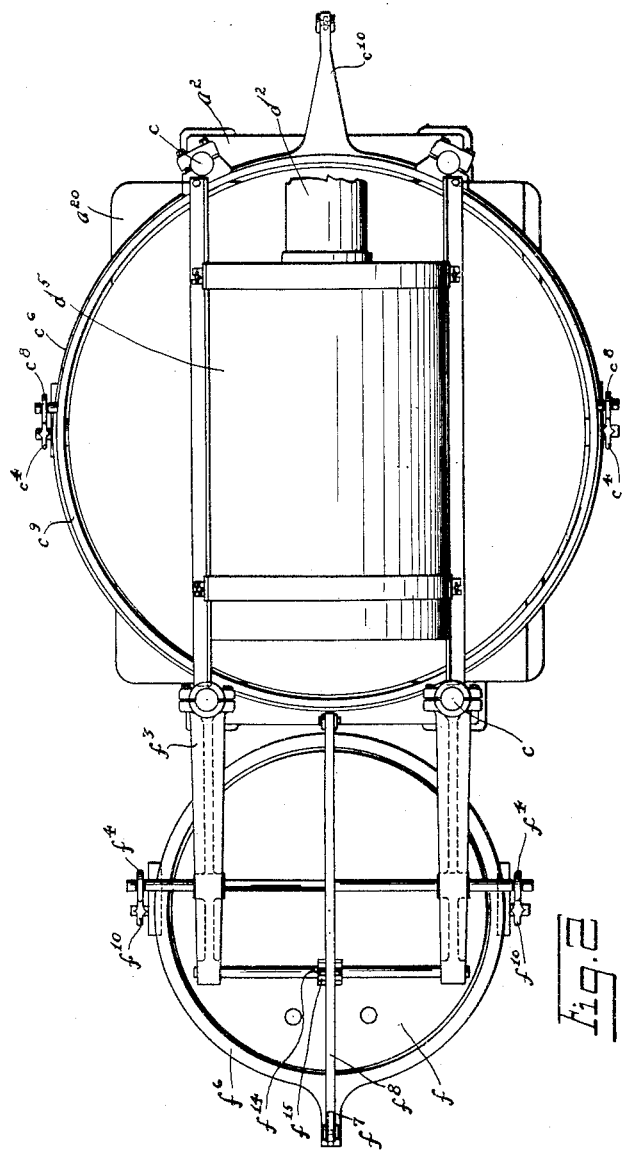
Inventor
WILLIAM G. KIRCHHOFF
By *Walter F. Murray*
Attorney

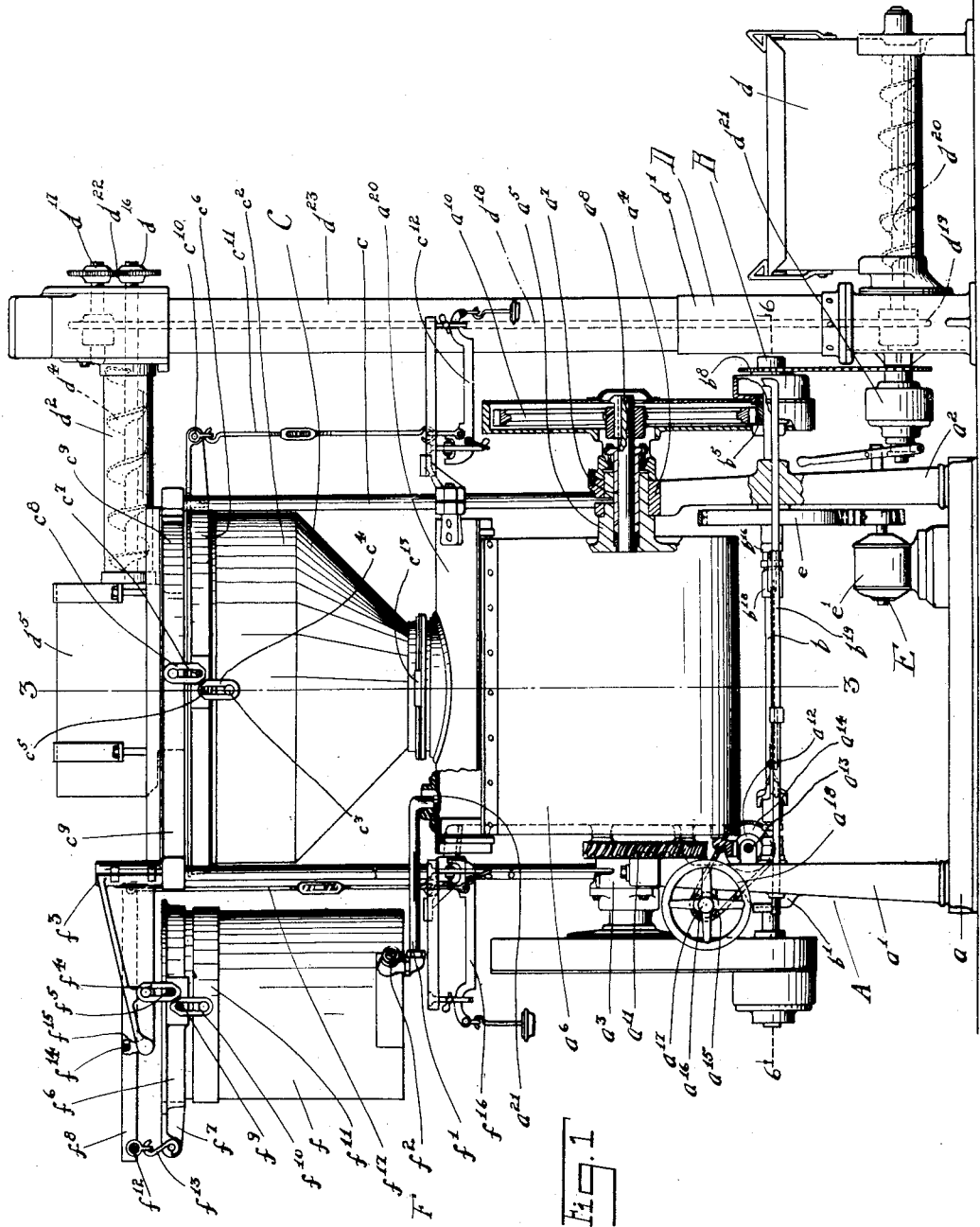

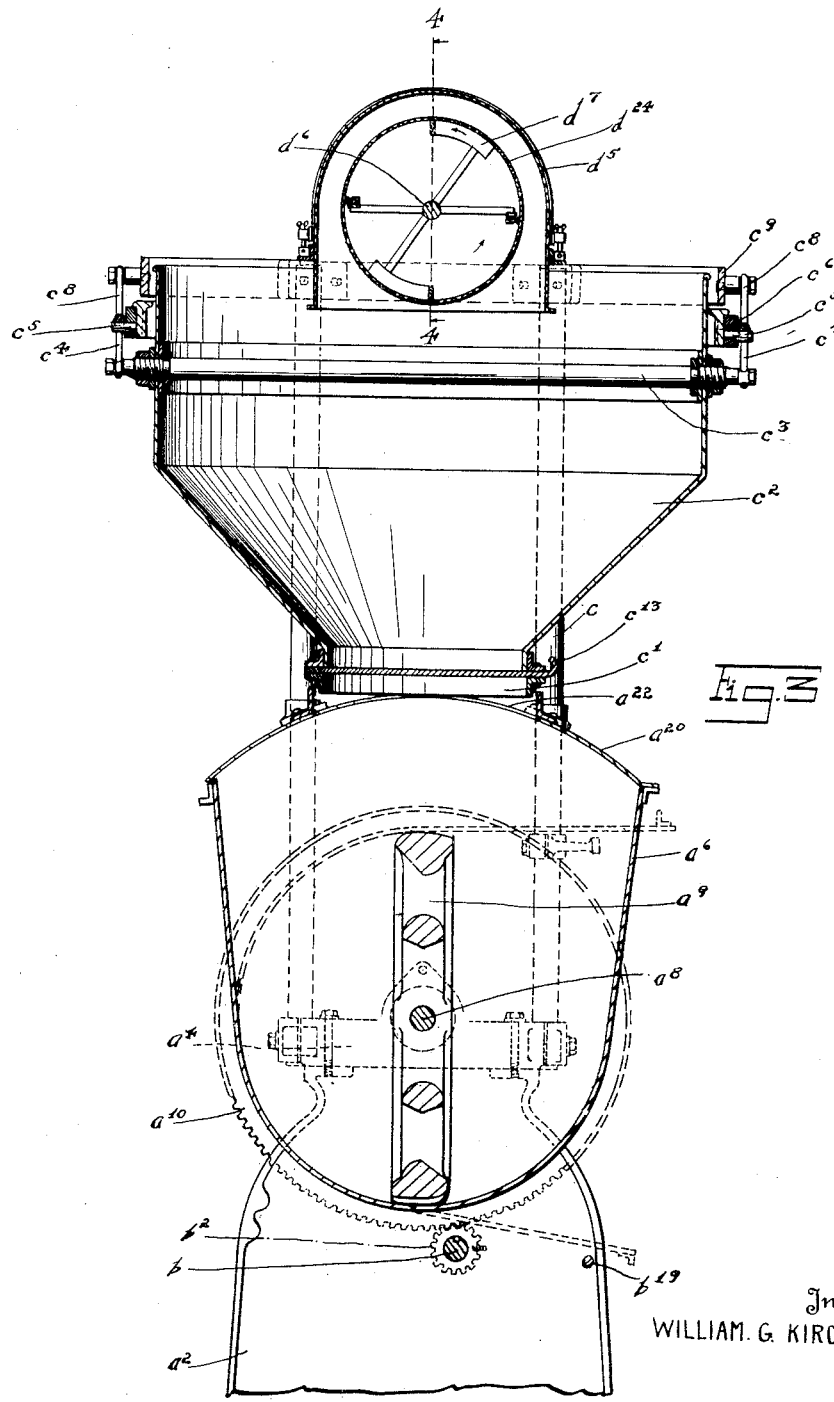

Jan. 22, 1924.
W. G. KIRCHHOFF
DOUGH MIXER
Filed Feb. 21, 1922
1,481,556
5 Sheets-Sheet 4
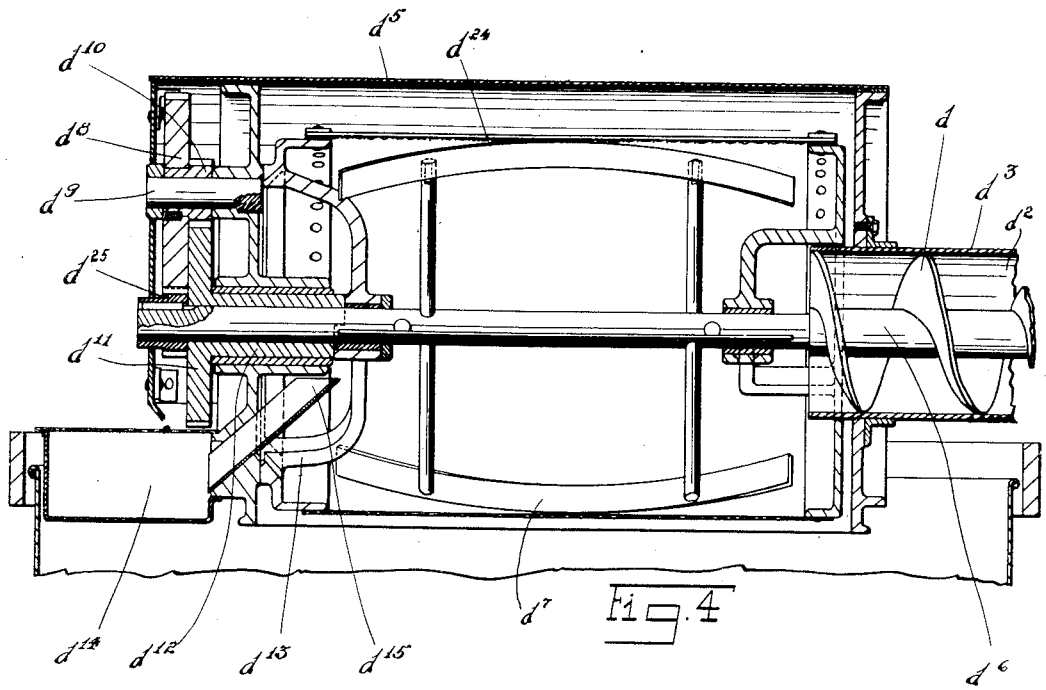
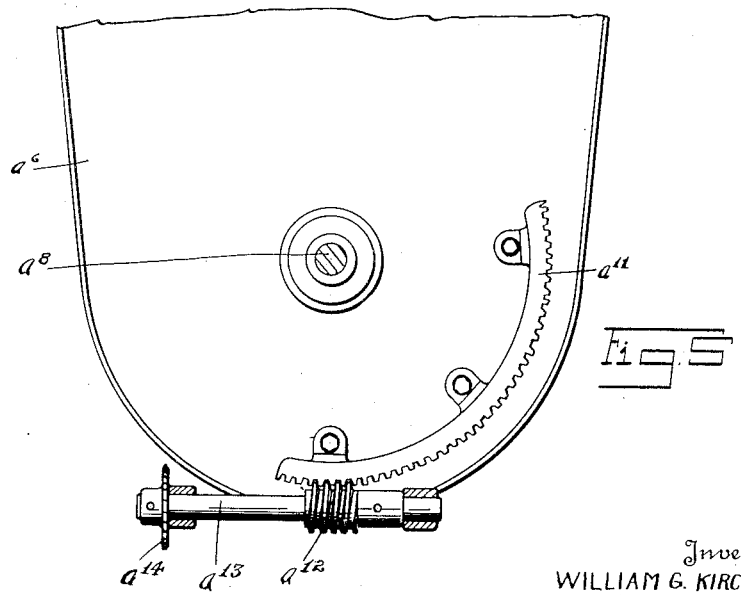
Inventor
WILLIAM G. KIRCHHOFF
By Walter H. Murray
Attorney Jan. 22, 1924.                                                   1,481,556
W. G. KIRCHHOFF
DOUGH MIXER
Filed Feb. 21, 1922            5 Sheets-Sheet 5
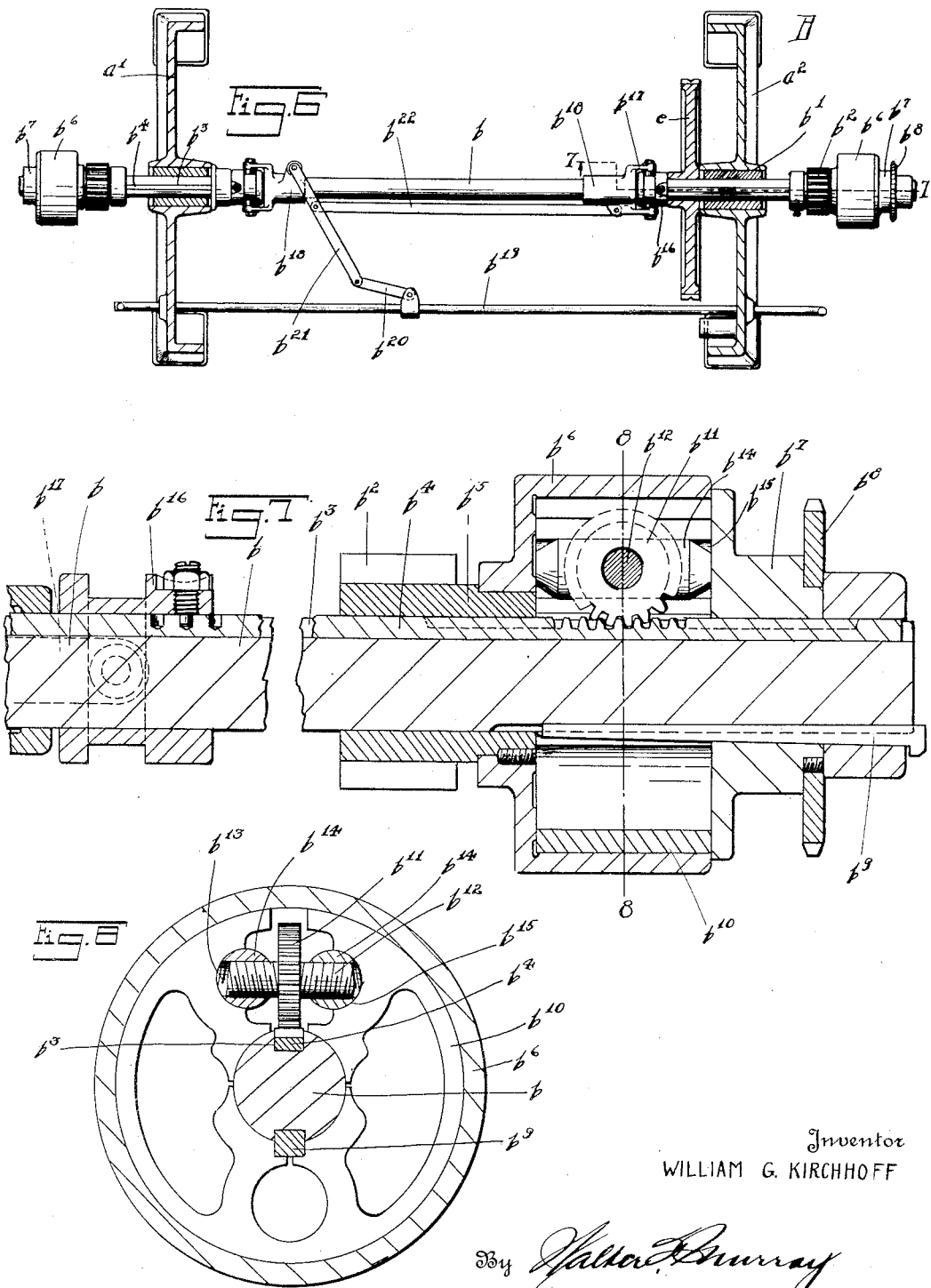
Inventor
WILLIAM G. KIRCHHOFF
By Walter F. Murray
Attorney Patented Jan. 22, 1924.

1,481,556

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

DOUGH MIXER.

Application filed February 21, 1922. Serial No. 538,309.

REISSUED

*To all whom it may concern:*

Be it known that I, WILLIAM G. KIRCHHOFF, a citizen of the United States of America, and a resident of Cincinnati, in the county of Hamilton and State of Ohio, have invented a new and useful Improvement in a Dough Mixer, of which the following is a specification.

An object of my invention is to provide a dough mixer that is simple in construction and operation and which requires a minimum of space.

Another object of my invention is to eliminate ceiling structures in bakeries.

Another object is to provide a device for the purpose stated, especially adapted for use in small bakeries.

These and other objects are attained by the means described herein and disclosed in the accompanying drawings in which:

Fig. 1 is a front elevation of a device embodying my invention.

Fig. 2 is a plan view, on an enlarged scale, of the device shown in Fig. 1, parts being broken away.

Fig. 3 is an enlarged sectional view of line 3—3 of Fig. 1.

Fig. 4 is an enlarged sectional view on line 4—4 of Fig. 3.

Fig. 5 is an enlarged fragmentary end view of a mixing bin and capsizing device thereof, all of which form details of my invention.

Fig. 6 is an enlarged sectional view on line 6—6 of Fig. 1.

Fig. 7 is an enlarged sectional view on line 7—7 of Fig. 6.

Fig. 8 is an enlarged sectional view on line 8—8 of Fig. 7.

My invention comprises a frame supporting a dough mixing bin $a^6$, a flour weighing device C, adapted to discharge into the mixing bin, a sifting mechanism above the weighing device C, adapted to discharge into the flour weighing device, a conveying system D adapted to convey flour to the sifting mechanism and a fluid weighing device F comprising a tank $f$ adapted to contain water or other fluids which are to be mixed with the flour, and which tank discharges into the mixing bin.

The frame A comprises a base $a$, upperwardly from which extend the uprights or sides $a^1$ and $a^2$, upon which uprights are mounted blocks $a^3$ and $a^4$ respectively. The blocks $a^3$ and $a^4$ have bearings mounted upon them adapted to accommodate the journals $a^5$ supporting a mixing bin $a^6$. The journals have aligned axial bores $a^7$ through which extends the shaft $a^8$. Interiorly to the bin, the shaft $a^8$ carries a suitable mixing paddle $a^9$, and upon the shaft $a^8$ adjacent its ends are mounted the gears $a^{10}$. A worm wheel segment $a^{11}$ is mounted on one side of the bin, and engages a worm $a^{12}$ carried by a shaft $a^{13}$ mounted upon the upright $a^1$. The shaft $a^{13}$ carries a sprocket $a^{14}$ about which extends a chain $a^{15}$ which chain also engages a sprocket $a^{16}$ mounted on a shaft $a^{17}$ carried by the upright $a^1$ and upon which shaft $a^{17}$ is mounted a suitable hand wheel $a^{18}$. The hand-wheel is actuated to tilt the mixing bin in order to remove the dough therefrom. The upper end of the bin is open.

The driving mechanism B is adapted to actuate the mixing paddle $a^9$ and comprises a shaft $b$ extending through bearings $b^1$ mounted upon the uprights $a^1$ and $a^2$. The shaft $b$ has revolubly mounted on it adjacent its outer ends, the sleeves $b^5$ carrying gears $b^2$, which gears engage the gears $a^{10}$ mounted on shaft $a^8$. The shaft $b$ has formed in it, adjacent its ends, longitudinal slots $b^3$ extending in parallelism with the axis of shaft $b$ and in which slots are reciprocally mounted racks $b^4$. The sleeves $b^5$ also carry clutch bands $b^6$. A collar $b^7$ is keyed to the shaft $b$ and carries a sprocket $b^8$. The key $b^9$ wherewith the collar is secured upon the shaft $b$, also serves to retain a clutch shoe $b^{10}$ in driving engagement with the shaft $b$. The clutch shoe is adapted to be expanded and contracted and to thereby bind and release the clutch band. This expansion and contraction of the clutch shoe is effected by means of a gear $b^{11}$ contained within the periphery of the clutch shoe and which carries an axial shaft $b^{12}$. The shaft $b^{12}$ extends through the gear $b^{11}$ and its ends are threaded in opposite directions. The gear $b^{11}$ engages a rack $b^4$. The ends of shaft $b^{12}$ engage in the threaded bores $b^{13}$ in the cylindrical blocks $b^{14}$ which blocks ride in semi-cylindrical seats $b^{15}$ formed in opposite portions of the clutch shoe. From the foregoing it is apparent that as the rack $b^4$ is reciprocated the gear $b^{11}$ and shaft $b^{12}$ are revolubly actuated thereby moving the blocks $b^{14}$ toward and away from the gear $b^{11}$ with a consequent expanding and contracting of the clutch shoe. The contraction of the shoe may be attained by giving spring qualities to the shoe. A clutch mechanism of the kind described is mounted at each end of the shaft $b$. Each of the racks $b^4$ is secured upon a spool $b^{16}$ reciprocally mounted upon the shaft $b$, and said spools are engaged by forks $b^{17}$ formed on the sleeves $b^{18}$, which sleeves are also reciprocally mounted upon the shaft $b$. The sleeves $b^{18}$ are adapted to permit rotation of the shaft $b$ within them, while the spools $b^{16}$ revolve with the shaft. A lever comprising a shift bar $b^{19}$ extends reciprocally through the uprights $a^1$, $a^2$, and which bar is pivotally connected by means of a link $b^{20}$ with the lever arm $b^{21}$, one end of which lever arm is pivotally connected with one of the sleeves $b^{18}$, and which lever arm is pivotally connected intermediate its ends with sleeve $b^{18}$ by means of a supplemental lever arm $b^{22}$. From the foregoing it is apparent that when the shift bar $b^{19}$ is reciprocated, the racks $b^4$ are actuated in opposite directions longitudinally of the shaft $b$, thereby causing joint transmission of power from shaft $b$ to shaft $a^8$ thru the clutch devices.

The flour weighing mechanism C is supported above the mixing bin by standards $c$ which are mounted upon the uprights $a^1$ and $a^2$, and which standards extend upwardly from said uprights. The standards also carry a cover $a^{20}$ for the mixing bin. The cover $a^{20}$ has an aperture $a^{22}$ which registers with the mouth $c^1$ of the flour container or flour bin $c^2$ suspended from the bar $c^3$, the opposite ends of which bar extends through chain links $c^4$. The chain links $c^4$ are supported upon knife edges $c^5$ extending from the ring $c^6$ which extends about the flour bin and carries an arm $c^{10}$ which together with the ring $c^6$ serve as a scale beam. Knife edges $c^7$ extending from the ring $c^6$ engage chain links $c^8$ suspended from the ring $c^9$ mounted upon the standards $c$. A connecting rod $c^{11}$ extends from arm $c^{10}$ to a scale beam $c^{12}$ mounted upon the standard $c$. A suitable slide $c^{13}$ controls communications between the flour bin and the mixing bin.

The flour is conveyed to the flour container $c^2$ by the conveyor system D comprising an intake or dumping bin $d$ which has a spiral screw conveyor extending across its lower portion. The lower portion of the supply bin $d$ communicates with a pocket at the base of a substantially vertical bucket conveyor $d^1$ which may be driven thru a clutch $d^{21}$ from the sprocket $b^8$ on the shaft $b$. At its upper end, the bucket conveyor discharges the flour into a horizontal conveyor $d^2$ comprising a conduit $d^3$ within which is revolubly actuated a spiral screw $d^4$. The conduit $d^3$ discharges into a cylindrical sieve $d^{24}$, having its axis in alignment with that of the screw $d^4$. The sieve $d^{24}$ is contained within a suitable house or casing $d^5$, the lower end of which is open, whereby communication of the interior of the housing $d^5$ with the flour bin $c^2$ is established. The shaft $d^6$ which serves as the axis for the screw $d^4$ extends through the sieve and carries paddles $d^7$ adapted to agitate the flour within the sieve. The shaft $d^6$ carries a small gear $d^{25}$ which engages a large gear $d^8$ mounted upon a suitable shaft $d^9$. A small gear $d^{10}$ mounted on shaft $d^9$ and secured to gear $d^8$ actuates the large gear $d^{11}$, upon the hub $d^{12}$ of which gear $d^{11}$, is mounted a spider $d^{13}$ supporting the sieve $d^{24}$. From the foregoing it is apparent that the paddles will revolve at a relatively higher rate of speed than will the sieve. A suitable receptacle $d^{14}$ communicates with the interior of the sieve by means of a chute $d^{15}$ whereby the tailings may be discharged from the interior of the sieve. The shaft $d^6$ is driven from the elevator or bucket conveyor by any suitable means such as by mounting sprockets $d^{16}$ and $d^{17}$ on the shaft $d^6$ and upon the shaft about which the upper end of the bucket conveyor travels, respectively, a chain $d^{22}$ extending about the sprockets $d^{16}$ and $d^{17}$. The sprockets $d^{16}$ and $d^{17}$ and chain $d^{22}$ are disposed without the conveyor casing $d^{23}$. A bucket carrying chain $d^{18}$ forming part of this bucket conveyor extends about the sprocket $d^{17}$ and about a sprocket $d^{19}$ mounted on the shaft $d^{20}$ which extends into the receptacle $d$ and carries the spiral screw adapted to move the flour into the bucket conveyor casing. A suitable clutch mechanism $d^{21}$ controls the shaft $d^{20}$.

The driving mechanism E comprises a pulley $e$ mounted on the shaft $b$, and which pulley may be driven from any suitable source of power, such as the motor $e^1$ mounted upon the base $a$.

The fluid weighing device F comprises a tank $f$ from the lower end of which extends a pipe $f^1$ the opposite ends of which communicate with the interior of the tank $f$ and with a port $a^{21}$ formed in the cover $a^{20}$ of the mixing bin. A suitable valve $f^2$ controls the flow through the pipe $f^1$. The tank $f$ is suspended in such manner that the contents may be weighed. The weighing means comprises brackets $f^3$ mounted upon the standards $c$ and from which brackets are suspended chain links $f^4$ which are engaged by knife edges $f^5$ formed on the ring $f^6$, and from which ring extends an arm $f^7$ connected with a lever arm $f^8$ by any suitable means such as link $f^{13}$. The ring $f^5$ carries knife edges $f^9$ which are engaged by chain links $f^{10}$ supporting the band $f^{11}$ mounted at the upper end of the tank $f$. The lever arm carries at its outer end, a knife edge $f^{12}$ from which is suspended the connecting link $f^{13}$ supporting the arm $f^7$. Knife edges $f^{14}$ mounted on the lever arm $f^8$, intermediate its ends, are supported by suitable balance seats $f^{15}$ extending upwardly from the brackets $f^3$. The other or inner end of the lever arm $f^8$ is connected with a scale beam $f^{16}$ by means of a suitable connecting rod $f^{17}$. The scale beams $f^{16}$ and $c^{12}$ may be mounted upon the frame in any suitable manner in order to render the beams readily accessible.

The operation of my device is as follows:
Flour is dumped into the bin $d$, generally in barrel lots, and is conveyed from the bin $d$ into the bottom of the bucket conveyor casing $d^{23}$ from thence it is carried to the conduit $d^2$ by means of the bucket conveyor system. From the conduit $d^2$ the flour is discharged into the screen or sieve and then after having been sifted is discharged into the flour weighing bin $c^2$. When a sufficient quantity of flour is contained within the bin $c^2$, further movement of flour from bin $d$, through the several conveyors and the sieve is stopped by means of the clutch mechanism $d^{21}$. The flour is then discharged into the mixing bin $a^6$. During this time water is admitted to the tank $f$ until the desired quantity is contained therein, this being determined by means of the scale $f^{16}$. The fluid is then discharged into the mixing bin and the substance within the mixing bin is agitated by means of paddle $a^9$. The paddle $a^9$ is rendered operative or inoperative by operating the shaft $b^{19}$, which shaft in turn actuates the clutches mounted on shaft $b$ and which control the transmission of power to the gears $a^{10}$. After the dough has been mixed, the bin may be tilted or capsized by revolubly actuating the hand wheel $a^{18}$, whereupon the batch of dough may be readily withdrawn or rolled from the mixing bin.

What I claim is:

1. In a device of the class described the combination of a frame, a dough mixer mounted on the frame, a flour weighing mechanism mounted on the frame adapted to discharge into the mixer, a fluid weighing device mounted on the frame adapted to discharge into the mixer, a sifter mechanism mounted on the frame discharging into the flour weighing mechanism, a vertical conveyor disposed adjacent the frame adapted to discharge into the sifter mechanism, and means mounted on the frame adapted to actuate the mixer, the conveyor and the sifter mechanisms.

2. In a device of the class described the combination of a dough mixer comprising a bin or trough, a mixer shaft extending revolubly thru the trough, a mixing paddle within the trough mounted on the mixing shaft, a second shaft parallel and substantially coextensive with the first shaft, intermeshing gears mounted on said shafts adjacent both their ends, a clutch operative individually upon each pair of gears, a connection between the clutches adapted in cooperation with the clutches to attain simultaneous transmission from the clutches thru their respective pairs of gears, and means to drive the second mentioned shaft.

3. In a device of the class described the combination of a dough mixer comprising a bin or trough, a mixer shaft extending revolubly thru the trough, a mixing paddle within the trough mounted on the mixing shaft, a second shaft parallel and substantially coextensive with the first shaft, intermeshing gears mounted on said shafts adjacent both their ends, a clutch operative individually upon each pair of gears, a connection between the clutches adapted in cooperation with the clutches to attain simultaneous transmission from the clutches thru their respective pairs of gears, means to drive the second mentioned shaft, a flour weighing mechanism adapted to discharge into the trough, a flour sifting mechanism discharging into the flour weighing mechanism, a conveyor adapted to discharge into the sifting mechanism, and a driving connection between the second mentioned shaft and the conveyor and the sifting mechanism.

4. In a device of the class described the combination of a dough mixer, a flour weighing mechanism, adapted to discharge into the mixer, a flour sifting mechanism adapted to discharge into the flour weighing mechanism, a conveyor system adapted to discharge flour into the sifting mechanism, a fluid weighing mechanism adapted to discharge into the mixer, and means to actuate the conveyor system, the sifting mechanism and the mixer.

5. In a device of the class described the combination of a dough mixer comprising a bin or trough, a mixer shaft extending revolubly thru the trough adapted to agitate the contents of the trough, gears mounted at both ends of the mixer shaft, a drive shaft having slots extending longitudinally of itself, gears mounted revolubly on the drive shaft, one each of which engages a gear on the mixer shaft, a clutch band fixedly connected with each of the second mentioned gears, clutch shoes fixedly mounted on the drive shaft one each adapted to bind upon one of the clutch bands, a gear revolubly mounted on each shoe, a shaft extending thru the last mentioned gear and adapted to revolve therewith the ends of the last mentioned shaft being threaded in opposite directions, blocks having threaded bores mounted on the opposite ends of said threaded shaft pivotally engaging the shoe, racks reciprocally mounted in the slots in the drive shaft each engaging one of the gears on the shoes, and a lever adapted to actuate the racks in such manner that each clutch shoe is brought into binding relation with its respective clutch band simultaneously with one another.

In testimony whereof, I have hereunto subscribed my name this 10th day of February, 1922.

WILLIAM G. KIRCHHOFF.